US011402728B2

(12) United States Patent
Yokoi

(10) Patent No.: US 11,402,728 B2
(45) Date of Patent: Aug. 2, 2022

(54) PLATFORM APPARATUS AND PLATFORM SYSTEM HAVING THE SAME

(71) Applicant: CANON KABUSHIKI KAISHA, Tokyo (JP)

(72) Inventor: Takeaki Yokoi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/935,396

(22) Filed: Jul. 22, 2020

(65) Prior Publication Data

US 2021/0033949 A1 Feb. 4, 2021

(30) Foreign Application Priority Data

Jul. 31, 2019 (JP) ............................ JP2019-140623

(51) Int. Cl.
*G03B 17/56* (2021.01)

(52) U.S. Cl.
CPC ......... *G03B 17/561* (2013.01); *G03B 17/563* (2013.01)

(58) Field of Classification Search
CPC .................................................... G03B 17/563
See application file for complete search history.

(56) References Cited

U.S. PATENT DOCUMENTS

2007/0050139 A1* 3/2007 Sidman ................ G03B 17/561 318/649
2016/0033077 A1* 2/2016 Chen ......................... A45F 5/10 294/139
2021/0156509 A1* 5/2021 Liao ....................... F16M 13/04

FOREIGN PATENT DOCUMENTS

JP 2008-124557 A 5/2008

* cited by examiner

*Primary Examiner* — Noam Reisner
(74) *Attorney, Agent, or Firm* — Cowan, Liebowitz & Latman, P.C.

(57) ABSTRACT

A platform apparatus includes a first unit that includes a first driver and is rotatable around a first axis by a driving force of the first driver, a second unit that includes a second driver and rotates a holder configured to hold an optical apparatus by a driving force of the second driver around a second axis orthogonal to the first axis, a first grip, and a second grip. The first and second drivers are located on one side of a plane that is orthogonal to a plane that includes the first axis and the second axis, and includes an imaginary line that connects the first grip and the second grip to each other.

11 Claims, 4 Drawing Sheets

12
11
6
10
8
3
4
7
9
5

PLATFORM APPARATUS AND PLATFORM SYSTEM HAVING THE SAME

BACKGROUND OF THE INVENTION

Field of the Invention

The present invention relates to a platform apparatus and platform system having the same.

Description of the Related Art

If a transportation orientation is not clear in transporting a steel robot platform, a user may transport it by gripping the end of the platform. In such a case, the entire mass may be concentrated on a driver or an unexpected force may be applied to the shaft, which may damage the internal structure. In addition, the platform may drop during the transportation, or the user may fall down. Japanese Patent Laid-Open No. ("JP") 2008-124557 discloses a platform apparatus having a grip.

When a steel robot platform is used, an assembly into a truss and pedestal is made after setting operations, such as an assembly in a use location, an installment of a camera and lens, and a calibration. When the platform apparatus disclosed in JP 2008-124557 is set, the work orientation becomes unstable or it is necessary to use a dedicated jig to make stable the work orientation.

SUMMARY OF THE INVENTION

The present invention provides a platform apparatus that can be safely transported and easily set, and a platform system including the platform apparatus.

A platform apparatus according to one aspect of the present invention includes a first unit that includes a first driver and is rotatable around a first axis by a driving force of the first driver, a second unit that includes a second driver and rotates a holder configured to hold an optical apparatus by a driving force of the second driver around a second axis orthogonal to the first axis, a first grip, and a second grip. The first and second drivers are located on one side of a plane that is orthogonal to a plane that includes the first axis and the second axis, and includes an imaginary line that connects the first grip and the second grip to each other. A platform system having the above platform apparatus also constitutes another aspect of the present invention.

Further features of the present invention will become apparent from the following description of exemplary embodiments with reference to the attached drawings.

DESCRIPTION OF THE EMBODIMENTS

Figure 1:
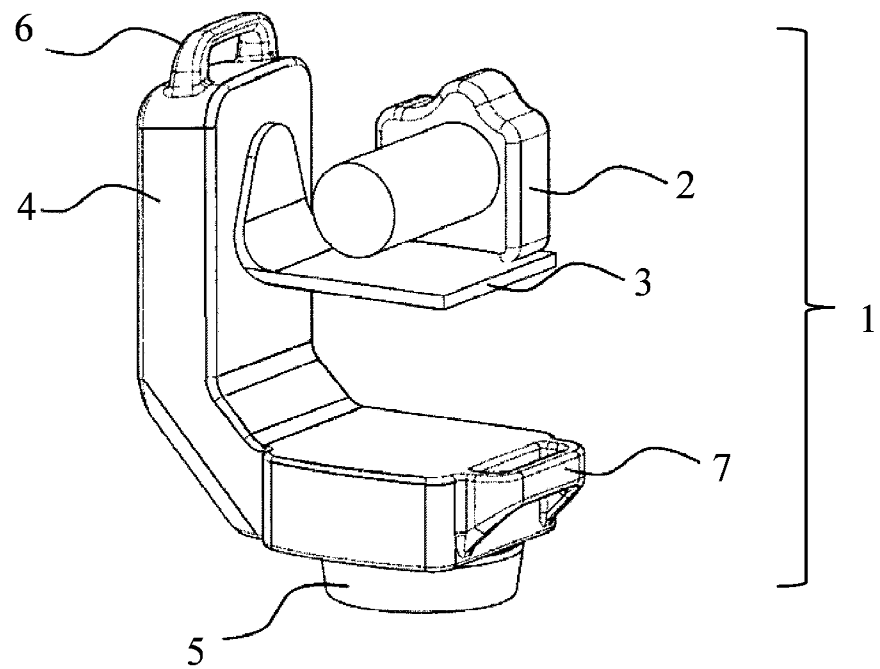
FIG. 1 is a perspective view of a platform system according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

FIG. 1 is a perspective view of a platform (or pan head) system 1 according to this embodiment. The platform system 1 has an angle (holder) 3, a head (platform apparatus) 4, and a pedestal 5. The angle 3 can hold an optical apparatus 2, such as a camera and a lens, and be rotated by a driving force of a tilt driver 8 described later. The head 4 holds the angle 3 rotatably in the tilt direction, and is rotated by a driving force of a pan driver 9 described later. The pedestal 5 holds the head 4 rotatably in the pan direction. The pedestal 5 is fastened to a stand or the like with bolts or the like (not shown). The head 4 has grips 6 and 7.

Figure 2:
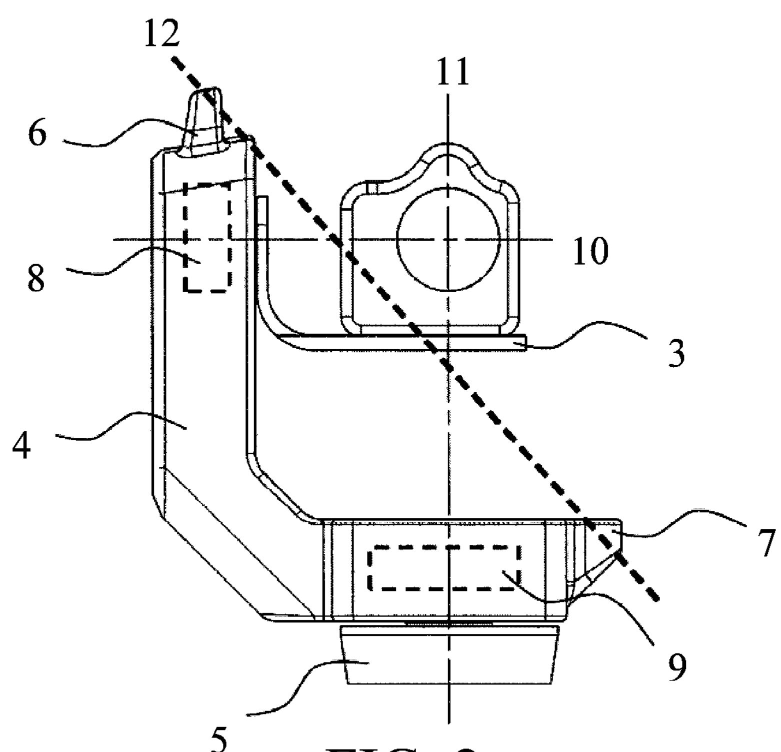
FIG. 2 is a front view of a platform system according to the first embodiment.

FIG. 2 is a front view of the platform system 1. The tilt driver (second driver) 8 and the pan driver (first driver) 9 shown by dotted lines are built in the head 4. The tilt driver 8 rotates the angle 3 with respect to the head 4 in the tilt direction around a tilt rotation shaft (second shaft) 10. The pan driver 9 rotates the angle 3 fixed onto the head 4 by rotating the head 4 relative to the pedestal 5 in the pan direction around the pan rotation axis (first axis) 11.

The grip (second grip) 6 is provided on the opposite side of the pan driver 9 with respect to the tilt rotation axis 10. The grip (first grip) 7 is provided on the opposite side of the tilt driver 8 with respect to the pan rotation axis 11. In other words, the tilt driver 8 and the pan driver 9, which are heavy components in the platform system 1, are located on one side of a plane (imaginary plane hereinafter) that is orthogonal to a plane including the tilt rotation axis 10 and the pan rotation axis 11, and includes an imaginary line 12 that connects the grips 6 and 7 to each other.

Figure 3:
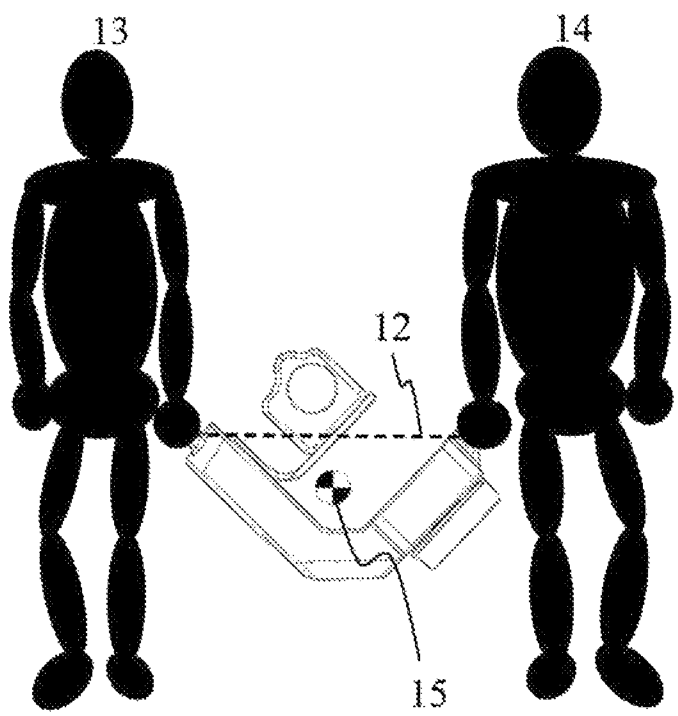
FIG. 3 illustrates a transportation state of the platform system according to the first embodiment.

FIG. 3 illustrates a transported state of the platform system 1. Since the platform system 1 usually has a weight of 10 kg or more, it is desirable that two people transport it. When persons 13 and 14 carry the platform system 1, an imaginary plane (a plane that is orthogonal to the paper plane and includes the imaginary line 12) is substantially parallel to the ground. At this time, since the driver, which is a heavy component in the platform system 1, is located on the ground side with respect to the imaginary plane, a center of gravity 15 of the entire platform system 1 is also naturally located on the ground side with respect to the imaginary plane. Since the center of gravity 15 is located at a low position during the transportation, the stable transportation with both grips is available.

Figure 4:
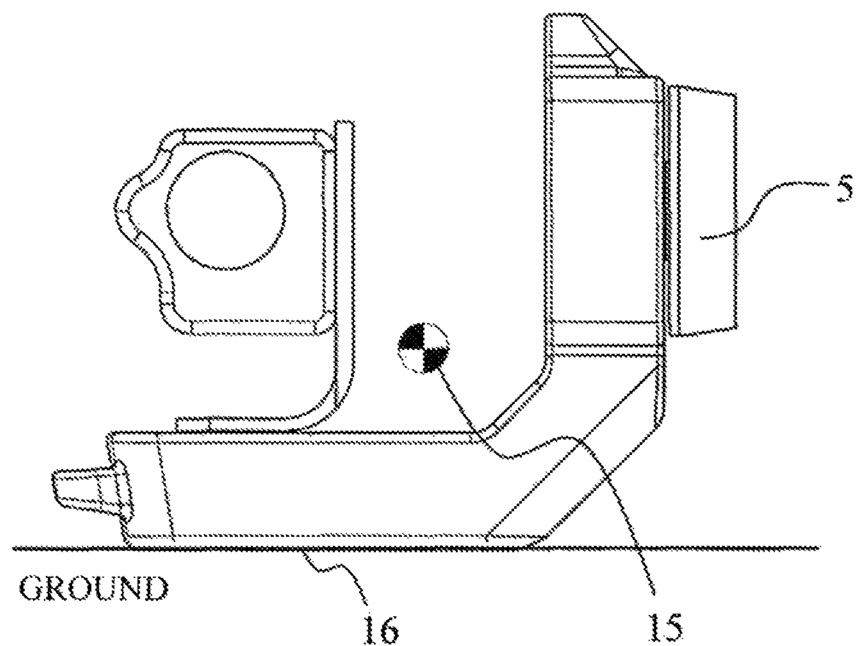
FIG. 4 illustrates a setting state of the platform system according to the first embodiment.

Generally, when the steel platform system is set up, an unillustrated grounding attachment is often attached to the pedestal, while it is in the fallen state rather than the use state. FIG. 4 illustrates the setting state of the platform system 1, in which a setting grounded surface 16 provided on the head 4 faces and contacts the ground (installation plane). Herein, a perpendicular from the center of gravity 15 to the ground may intersect the setting grounded surface 16. Due to this configuration, the optical apparatus 2 and the attachment can be easily and stably adjusted. The setting grounded surface 16 may be provided with anti-slippery or rubber feet (foot members) for stabilization.

As described above, the configuration according to the present embodiment can realize a platform apparatus that can be safely transported and easily set.

Second Embodiment

Since the basic structure and operation relationship of the platform system according to this embodiment are the same as those of the platform system 1 according to the first embodiment, a description thereof will be omitted, and this embodiment will discuss only differences from the platform system 1.

Figure 5:
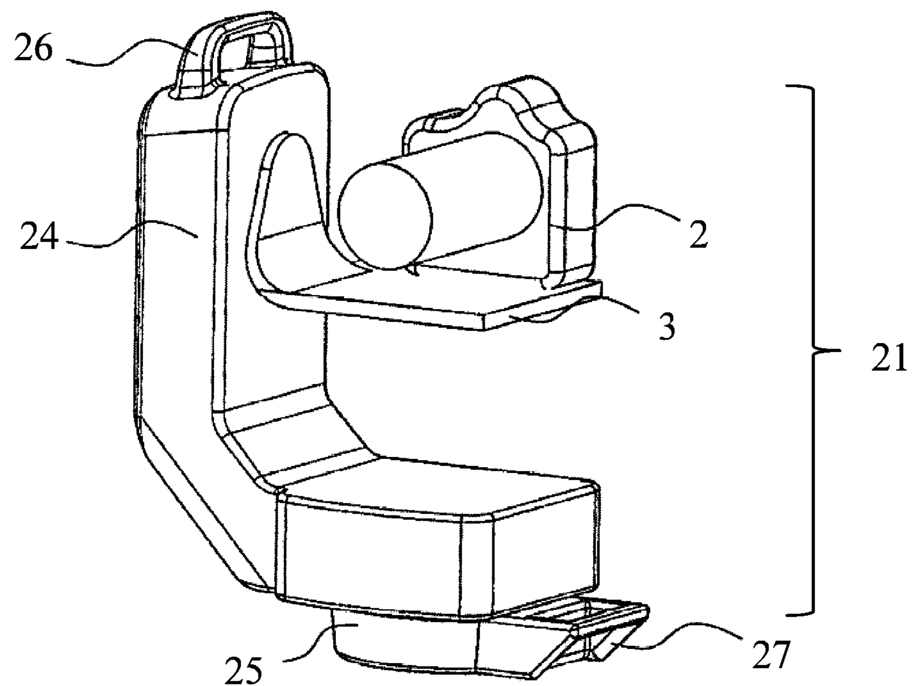
FIG. 5 is a perspective view of a platform system according to a second embodiment.

FIG. 5 is a perspective view of the platform system 21 according to this embodiment. The platform system 21 has the angle 3, a head (platform apparatus) 24, and a pedestal 25. The head has a grip 26. The pedestal 25 has a grip 27.

Figure 6:
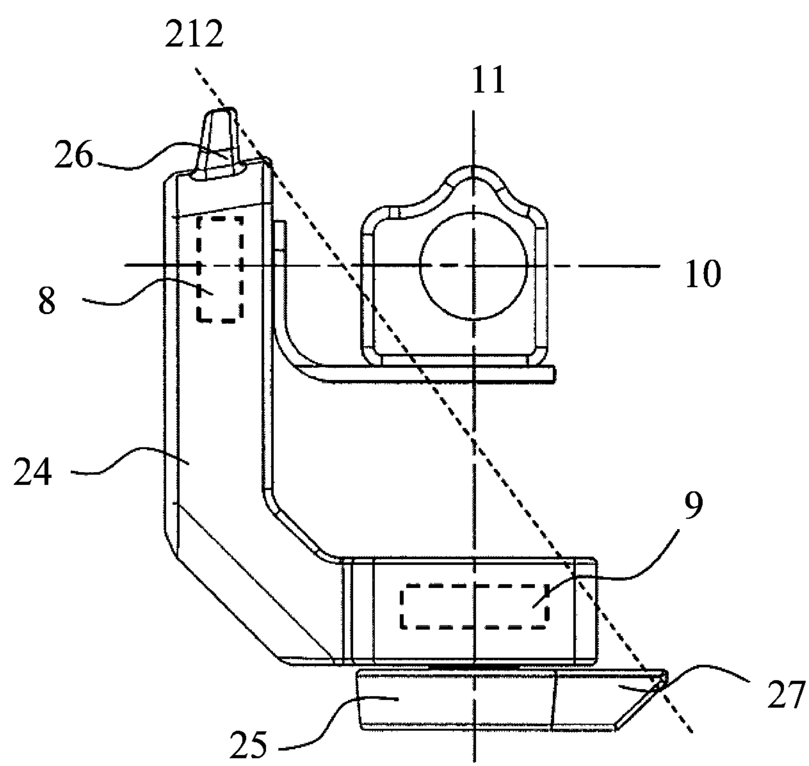
FIG. 6 is a front view of the platform system according to the second embodiment.

FIG. 6 is a front view of the platform system 21. The grip (second grip) 26 is provided on the opposite side of the pan driver 9 with respect to the tilt rotation axis 10. The grip (first grip) 27 is provided on the opposite side of the tilt driver 8 with respect to the pan rotation axis 11. In other words, the tilt driver 8 and the pan driver 9, which are heavy components in the platform system 21, are located on one side of a plane that is orthogonal to a plane including the tilt rotation axis 10 and the pan rotation axis 11, and includes an imaginary line 212 that connects the grips 26 and 27 to each other.

The configuration according to this embodiment can realize a platform apparatus that can be safely transported and easily set.

Third Embodiment

Since the basic structure and operation relationship of the platform system according to this embodiment are the same as those of the platform system 1 according to the first embodiment, a description thereof will be omitted, and this embodiment will discuss differences from the platform system 1.

Figure 7:
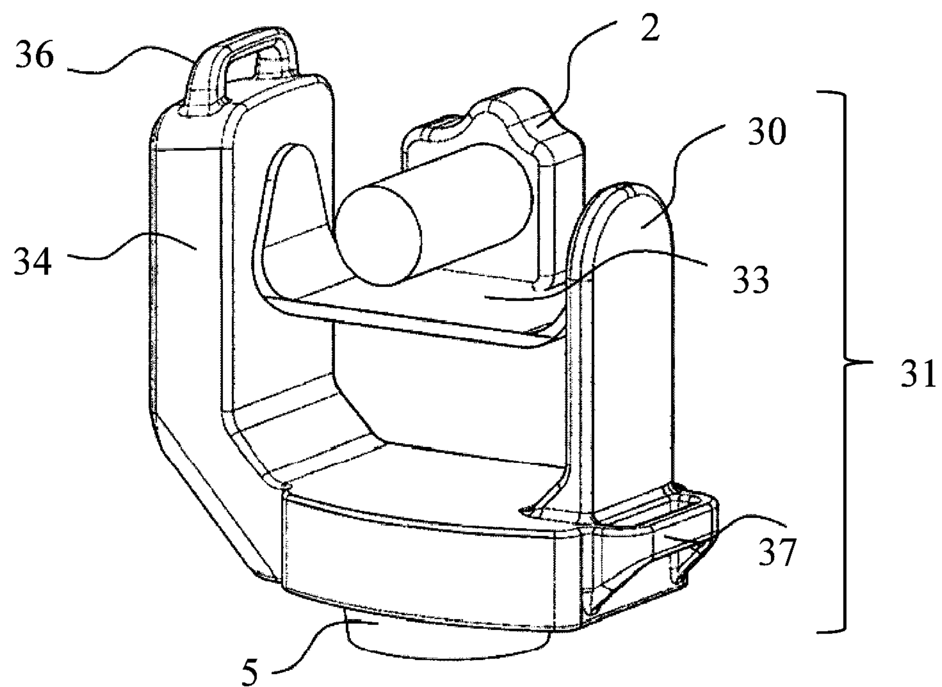
FIG. 7 is a perspective view of a platform system according to a third embodiment.

FIG. 7 is a perspective view of a platform system 31 according to this embodiment. A platform system 21 includes an angle (holder) 33, a head (platform apparatus) 34, and a pedestal 35. The head 34 has grips 36 and 37. Both sides of the angle 33 are supported by a support 30 extending from the head 34.

Figure 8:
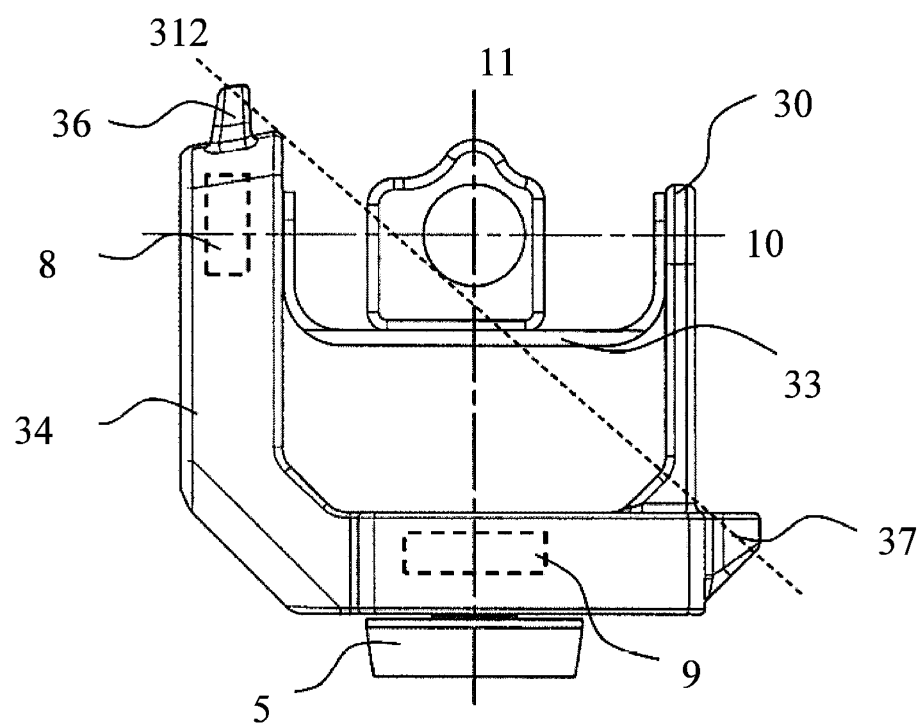
FIG. 8 is a front view of the platform system according to the third embodiment.

FIG. 8 is a front view of the platform system 31. The grip (second grip) 36 is provided on the opposite side of the pan driver 9 with respect to the tilt rotation axis 10. The grip (first grip) 37 is provided on the opposite side of the tilt driver 8 with respect to the pan rotation axis 11. In other words, the tilt driver 8 and the pan driver 9, which are heavy components in the platform system 21, are located on one side of a plane that is orthogonal to a plane including the tilt rotation axis 10 and the pan rotation axis 11, and includes the imaginary line 312 that connect the grips 36 and 37 to each other.

The configuration according to this embodiment can realize a platform apparatus that can be safely transported and easily set.

In any of the embodiments, the grip may be detachably attached, or housed in the head or the pedestal so as to pop up. Two or more grips may be provided.

Although the head is integrally molded in each embodiment, as long as integrally usable, the head may include a first unit having one of the two drivers and a second unit having the other.

The angle may be rotatable relative to the head in a rotation direction around an axis orthogonal to the tilt rotation axis and the pan rotation axis.

The above embodiments can provide a platform apparatus that can be safely transported and easily set, and a platform system having the platform apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140623, filed on Jul. 31, 2019, which is hereby incorporated by reference herein in its entirety.

What is claimed is:

1. A platform apparatus comprising:

a pedestal;

a head that is held on the pedestal and is rotatable around a first axis with respect to the pedestal;

a first driver that can rotate the head around the first axis by a driving force;

a second driver that can rotate a holder configured to hold an optical apparatus and configured to be fixed to the head by a driving force around a second axis orthogonal to the first axis;

a first grip; and a second grip that is provided on an opposite side of the first driver with respect to the second axis, wherein the first and second drivers are located on one side of a plane that is orthogonal to a plane that includes the first axis and the second axis, and includes an imaginary line that connects the first grip and the second grip to each other, and wherein the second grip is provided at a position overlapping a range in which the second driver is projected in a direction parallel to the first axis.

2. The platform apparatus according to claim 1, wherein the first grip and the second grip are provided to the head, and wherein a distance from the first grip to the first driver is shorter than a distance from the first grip to the second driver, and a distance from the second grip to the second driver is shorter than a distance from the second grip to the first driver.

3. The platform apparatus according to claim 1, wherein the first grip is provided to the pedestal, wherein the second grip is provided to the head, and wherein a distance from the first grip to the first driver is shorter than a distance from the first grip to the second driver, and a distance from the second grip to the second driver is shorter than a distance from the second grip to the first driver.

4. The platform apparatus according to claim 1, wherein where a surface provided on the head faces a plane, a perpendicular line from a center of gravity of the platform apparatus to the plane intersects the surface provided on the head.

5. The platform apparatus according to claim 4, further comprising feet provided on the surface provided on the head.

6. The platform apparatus according to claim 1, further comprising a support provided at a position facing the second driver and configured to rotatably support the holder.

7. The platform apparatus according to claim 1, wherein the first grip is provided on an opposite side of the second driver with respect to the first axis.

8. The platform apparatus according to claim 1, wherein the first grip is provided at a position overlapping a range in which the first driver is projected in a direction parallel to the second axis.

9. The platform apparatus according to claim 1, wherein each of the first and second grips are a handle.

10. The platform apparatus according to claim 1, wherein the first and second drivers are located inside the head.

11. A platform system comprising:

a holder configured to hold an optical apparatus; and a platform apparatus, wherein the platform apparatus includes:

a pedestal;

a head that is held on the pedestal and is rotatable around a first axis with respect to the pedestal;

a first driver that can rotate the head around the first axis by a driving force;

a second driver that can rotate the holder configured to hold the optical apparatus and configured to be fixed to the head by a driving force around a second axis orthogonal to the first axis;

a first grip; and a second grip that is provided on an opposite side of the first driver with respect to the second axis, wherein the first and second drivers are located on one side of a plane that is orthogonal to a plane that includes the first axis and the second axis, and includes an imaginary line that connects the first grip and the second grip to each other, and wherein the second grip is provided at a position overlapping a range in which the second driver is projected in a direction parallel to the first axis.

* * * * *